Nov. 23, 1965   W. R. LORANG   3,218,955
COFFEE MAKING MACHINE
Filed Feb. 20, 1963   4 Sheets-Sheet 1
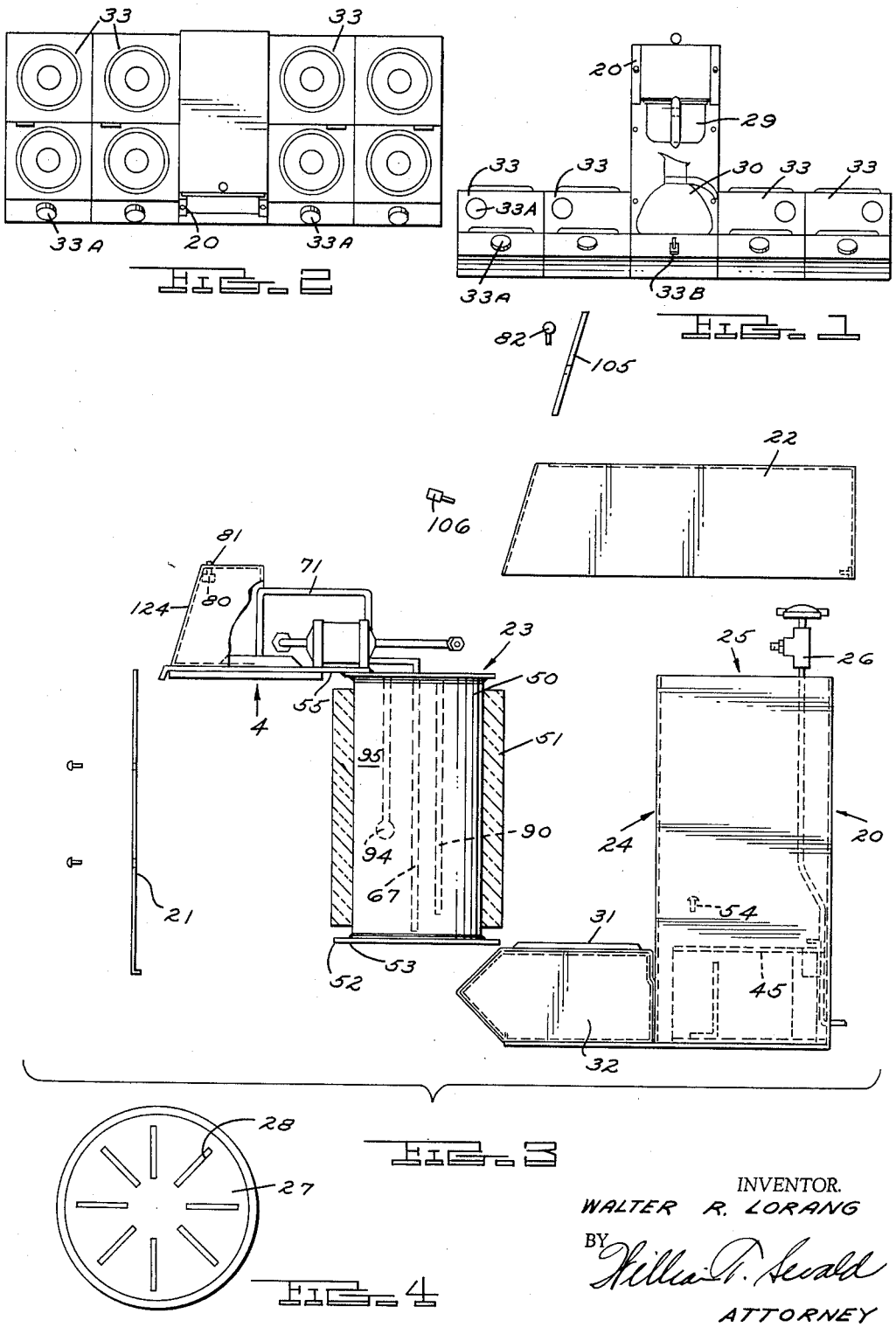
INVENTOR.
WALTER R. LORANG
BY
ATTORNEY Nov. 23, 1965  W. R. LORANG  3,218,955
COFFEE MAKING MACHINE
Filed Feb. 20, 1963  4 Sheets-Sheet 2
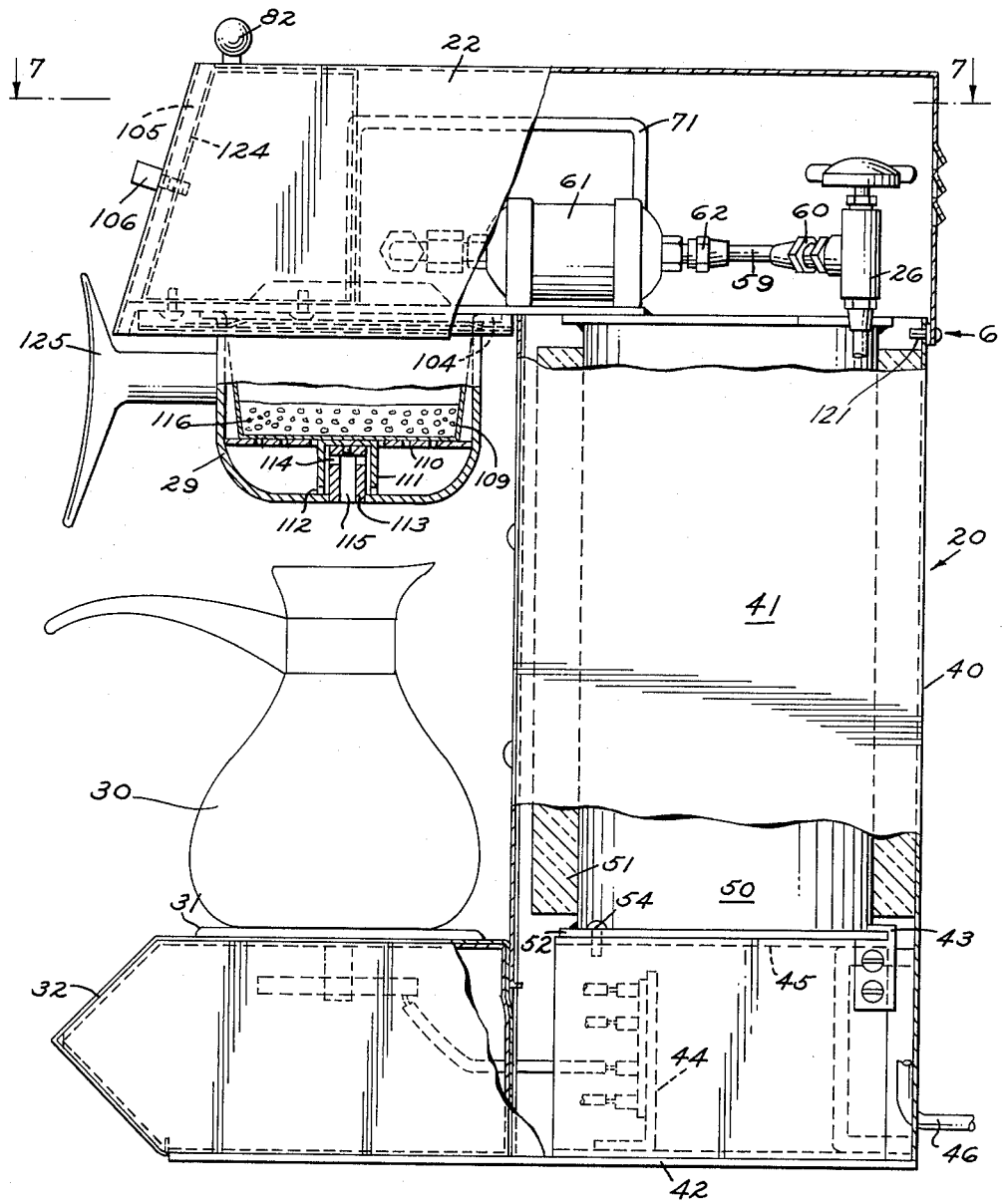
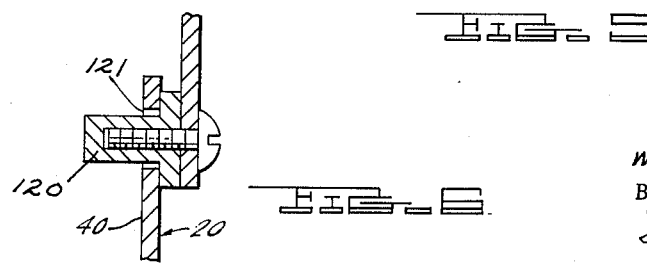
INVENTOR.
WALTER R. LORANG
BY
ATTORNEY

INVENTOR.
WALTER R. LORANG
BY
ATTORNEY

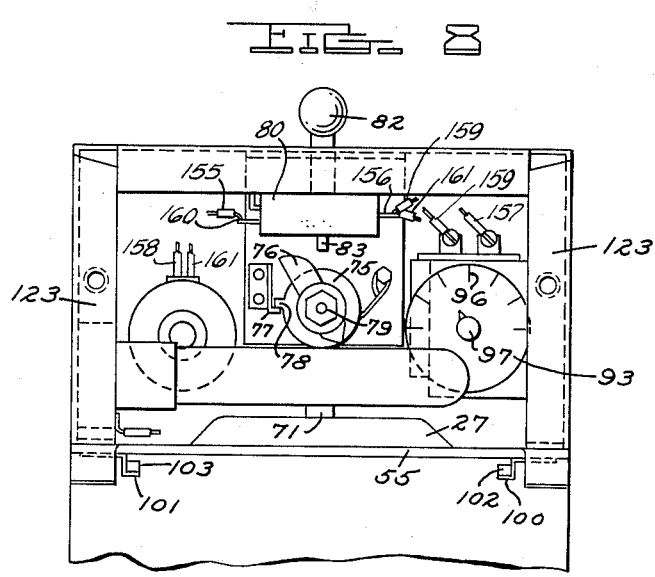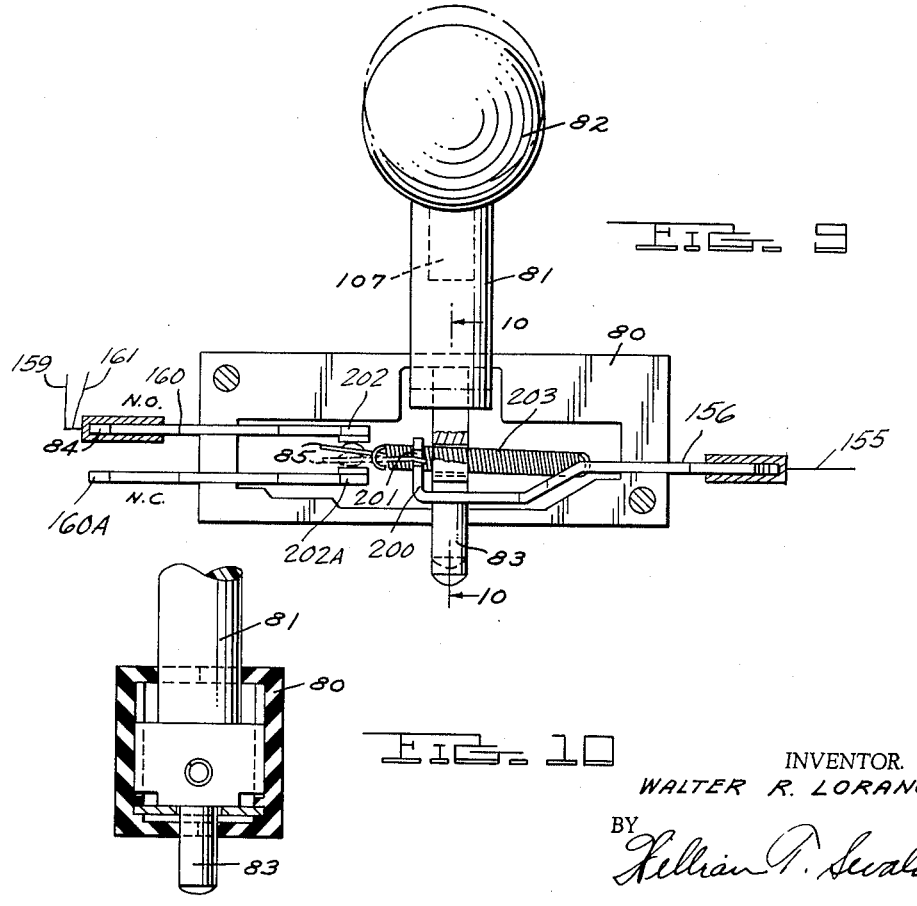

United States Patent Office 3,218,955
Patented Nov. 23, 1965

1

3,218,955
COFFEE MAKING MACHINE
Walter R. Lorang, 2239 W. Maple, Walled Lake, Mich.
Filed Feb. 20, 1963, Ser. No. 259,994
5 Claims. (Cl. 99—282)

This invention relates to coffee making devices and in particular to a cabinet box having a removable front and top and to a coffee making machine unit which is easily insertable and removable relative to the cabinet box and to improvements in coffee making machine units, systems, and controls.

Coffee making devices have been employed heretofore to facilitate making coffee quickly in small fresh batches, however, the several devices of the prior art have not proven entirely satisfactory inasmuch as they are complicated in design and construction, expensive to manufacture, difficult to use, and difficult and time consuming to service and maintain.

With the foregoing in view, the primary object of the invention is to provide a coffee making machine for making coffee quickly in small fresh batches which is simple in design and construction, inexpensive to manufacture, easy to use, easy to control, and which is easily accessible for replacement of the machine unit portion relative to the cabinet box portion so that very little service time is required.

An object of the invention is to provide a cabinet box having an easily removable front panel and top case so that the interior of the cabinet box is readily accessible from the front and top without moving the cabinet box from a permanently installed position.

An object of the invention is to provide a coffee making machine unit which is easily insertable and removable through the open front and top of the cabinet box to facilitate removing a used unit quickly and replacing it with a new replacement unit.

An object of the invention is to provide a cabinet box having an open front and top and a removable coffee making machine unit so that the cabinet box can be fixedly located in position at a lunch counter or a restaurant and the machine unit removed and replaced through the top and the front of the cabinet box without moving the cabinet and so that it is not necessary to move other equipment at the sides or back of the cabinet box to service the machine.

An object of the invention is to provide a coffee making machine unit which is easily removable and insertable in a cabinet box so that a supply bank of replacement units can be maintained on hand in selected geographical locations.

An object of the invention is to provide coffee making machine units in supply banks so that they are readily available to replace worn machine units.

An object of the invention is to provide a coffee making machine unit which is quickly replaceable as a whole so that the using restaurant may have a new unit installed immediately when the old unit becomes worn without loss of use of coffee making equipment.

An object of the invention is to provide a coffee making machine unit which is replaceable as a whole so that it takes only a few minutes to replace a worn unit with a new unit in a restaurant so that the coffee machine service man does not disturb or interfere with restaurant operation and so that a single service man can service a large area and a large number of machines.

An object of the invention is to provide coffee making machine units replaceable as a whole so that a relatively unskilled person may be used as the service man.

An object of the invention is to provide coffee making machine units replaceable as a whole so that units requiring repairs may be sent back to the factory or to a central repair point where a trained skilled workman may make the repairs without disturbing a restaurant and where he has complete repair facilities and replacement parts to efficiently and properly make the repairs.

An object of the invention is to provide a coffee making machine unit having readily available hot water heated to a controlled coffee making temperature at all times.

An object of the invention is to provide a single switch which controls the coffee making operation of the machine so that it can be turned off and on readily and immediately.

An object of the invention is to provide a coffee making machine unit having a single switch knob controlling the operation of the coffee making machine.

An object of the invention is to provide a system of emitting hot water at a controlled flow-rate over a measured time period to arrive at the desired coffee batch volume.

An object of the invention is to provide a flow rate control valve discharging through a solenoid operated valve connected electrically in parallel with a period timer so that the timer measures the time period during the open period of the solenoid operated valve.

An object of the invention is to provide a single switch connected in parallel to a solenoid operated valve and a period timer so that when the timer turns the switch to the off position the electric power to both the solenoid operated valve and timer is disconnected terminating the coffee making cycle.

An object of the invention is to provide an automatic reset timer and a normally closed solenoid operated valve so that the system resets itself automatically and is failsafe relative to electrical failure.

An object of the invention is to provide a novel single switch having actuating means inside and outside the cabinet so that the switch can be controlled manually externally of the cabinet box and so that it can be controlled internally of the cabinet by the timer.

An object of the invention is to provide a coffee making pot having a siphon disposed in the bottom thereof having a flow rate of lesser volume than the flow rate control valve in the system to back up a pre-determined volume of water in the pot to immerse the ground coffee in hot water during the coffee making cycle without overflowing the coffee pot.

An object of the invention is to provide a dispersing nozzle having orifices of greater capacity than the water line leading thereto so as to disperse the water over the ground coffee with only gravitational force thereby eliminating a projected spray and also providing a larger surface coverage of dripping hot water on the ground coffee.

These and other objects of the invention will become apparent by reference to the following description of a coffee making machine unit, cabinet box, switch, and controls embodying the invention taken in connection with the accompanying drawings in which:

FIG. 1 is a front elevational view of a novel coffee machine and cabinet box embodying the invention associated with banked side stoves.

FIG. 2 is a top plan view of the device seen in FIG. 1.

FIG. 3 is an enlarged side-elevational exploded view of the cabinet box, coffee making machine unit, cabinet box removable panels and associated parts showing the water tank insulation in cross-section and internal parts in dotted lines.

FIG. 4 is an enlarged plan view of the dispersing nozzle taken in the direction of the arrow 4 of FIG. 3.

FIG. 5 is an enlarged side-elevational view of the coffee making machine installed in the cabinet box with parts broken away, shown in dotted lines and partly in cross-section to better illustrate the component parts.

FIG. 6 is an enlarged fragmentary cross-sectional view of the back connecting means between the top case and the cabinet box as indicated at arrow 6 of FIG. 5.

FIG. 8 is an end elevational view of FIG. 7 with the front cover plate removed showing the interior parts and construction.

FIG. 9 is an enlarged cross-sectional view of the switch seen in FIG. 8.

FIG. 10 is a cross-sectional view of FIG. 9 taken on the line 10—10 thereof.

Figure 7:
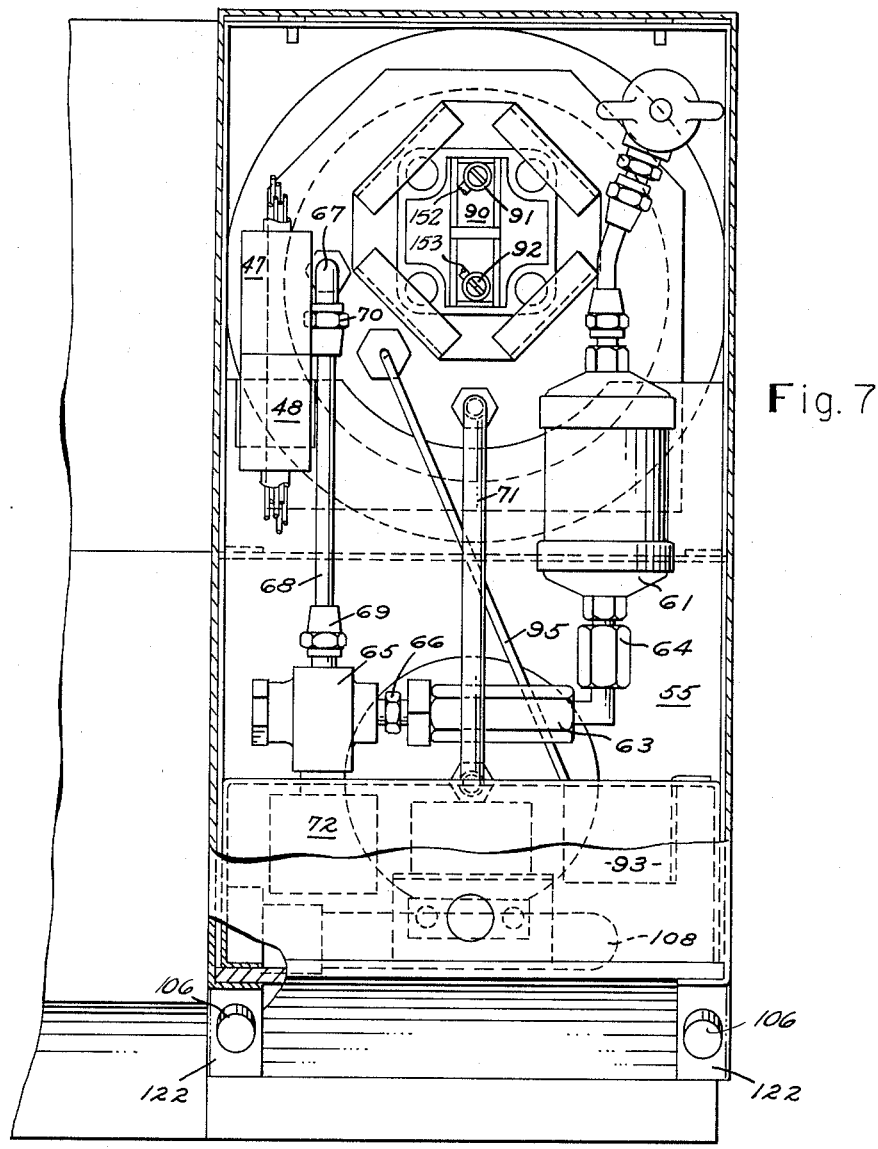
FIG. 7 is a top plan view of the device seen in FIG. 5 taken on the line 7—7 thereof showing the interior parts and construction.

Referring now to the drawings wherein the like numerals refer to like and corresponding parts throughout the several views, the novel coffee making machine, cabinet box, system, and controls disclosed therein to illustrate the invention comprise a cabinet box 20 having a removable front panel 21 and a removable top case 22. The cabinet box is opened by removing the panel 21 and case 22. A coffee making machine unit 23 is insertable in and removable from the cabinet box 20 through an open front 24 and an open top 25 of the cabinet box 20. Water under line supply pressure is fed through a hand shut-off valve 26 to the machine unit 23 and emits from the machine unit 23 through a dispersing nozzle 27 which has long slots 28 for dripping hot water on ground coffee in a pot 29. The water flows from the pot 29 through an aperture in the bottom thereof and falls into a coffee container 30 which rests on a stove heating element 31 of a platform 32. Like banked stove units 33 may be disposed on either side of the cabinet 20. Like cabinets 20 may be disposed along side one another with the banked stoves 33 positioned on either side singly and in combination as desired.

More particularly, FIG. 5, the cabinet box 20 includes a back panel 40, like side panels 41, a bottom panel 42 and the platform 32 which supports the heating element 31 on which rests the container 30 below the pot 29. An electrical connector block 44 is provided in the bottom of the cabinet 20 for making connections to the heating element 31 and to the heating elements of the banked side stoves 33 as desired.

A frame 45 is provided in the bottom of the cabinet box 20 for supporting the coffee making machine unit 23 within the cabinet box 20. In locating the cabinet box 20 in use, a permanent water connecting line 46 is fitted with the hand operated shut-off valve 26. When the machine unit 23 is removed from the cabinet box 20 the unit 23 is disconnected at the valve 26 and the valve 26 turned off to prevent escape of water. The cabinet box 20 has an electrical connector female block 47, FIG. 7, which contains the necessary electrical sockets for connecting to the terminals of a male block 48 carried by the coffee making machine unit 23. The blocks 47 and 48 facilitate connecting and disconnecting the electrical circuits between the cabinet box 20 and the machine unit 23 in removing and inserting the unit 23 relative to the cabinet box 20. The blocks 47 and 48 are readily connectable and disconnectable for inserting and removing the machine unit 23 relative to the cabinet box 20. Thus the electrical connections and the water connections to the machine unit 23 are easily connected and disconnected to facilitate replacement and repair of the machine unit.

The coffee making machine unit 23 comprises a tank 50 surrounded by a layer of insulation 51. A support plate 52 is welded to the bottom of the tank 50 and is equipped with apertures 53 for receiving bolts 54 to secure the plate 52 at the front on the platform 45. A flange 43 on the cabinet box 20 holds the plate 52 down at the rear. A plate 55 is welded to the top of the tank 50 and cantilevers forwardly therefrom to support the various control elements as hereinafter described.

A water line 59 is connected to the manual shut-off valve 26 by a coupling 60 and is connected to a water filter 61 by a coupling 62. A flow rate control valve 63 is connected to the other end of the water filter 61 by a coupling 64. The flow rate control valve 63 is connected at its other end to a solenoid operated shut-off valve 65 by a coupling 66. A water feed line 67 leading to the bottom of the tank 50 is connected to the shut-off valve 65 by a line 68 and couplings 69 and 70.

It can be seen that when the manual hand valve 26 is open and when the solenoid operated valve 65 is open, water flows under line pressure to the bottom of the tank 50 from the supply line 46 through the filter 61 and through the flow rate control valve 63 at a definite volume controlled flow rate and introduces water under pressure to the interior of the tank 50.

A water outlet pipe 71 is connected to the top of the water tank 50 and leads from the tank 50 to the dispersing nozzle 27, FIG. 5. Hot water from the tank 50 emits through the outlet pipe 71 to the pot 29 through from the effect of the line pressure introduced to the tank. The hot water is taken from the top of the tank 50 and the cold water is introduced adjacent the bottom of the tank 50. A solenoid 72 controls the operation of the shut-off valve 65 as hereinafter more fully described.

A water heating immersion unit 90, FIG. 3, is disposed through the top of the tank 50 and is connected via terminals 91 and 92 to the thermostat 93, FIG. 7, which is equipped with a switch, not shown, for connecting electric power to the immersion heating unit 90. A thermocouple or other heat sensitive element 94 is disposed in the tank 50 adjacent the cold water inlet pipe 67 so as to be influenced immediately by the introduction of cold water in the tank 50. The heat sensitive element 94 is connected via a lead 95 through the top of the tank 50 to the switch actuating means of the thermostat 93. The thermostat is equipped with a dial 96 and indicator 97 for adjusting the setting of the thermostat as desired. Catalogs and brochures of Minneapolis-Honeywell and similar companies show thermocouples, bi-metals, and thermostats suitable for installation and use.

As is well understood in the thermostat art, manually moving the indicator 97 relative to the dial 96 adjusts the temperature at which the thermostat 93 is sensitive to connect and/or disconnect power through its switch to the immersed heating unit 90. This provides easy water temperature control.

An automatic reset timer 75 is supported on the support plate 55, FIG. 8, and includes an angularly moving cam arm 76, a stationary stop 77, and a starting point positioning tab 78. Upon disconnection of power to the timer 75, the timer automatically resets and rotates counterclockwise as shown in FIG. 7 repositioning the arm 76 as controlled by the abutment between the tab 78 and the stop 77. This automatically locates the timer in correct starting position for the next operating cycle.

A control switch 80 is located above the timer arm 76 and is equipped with an actuating stem 81 which extends up through the switch 80 and terminates in a knob 82 at the top for manual operation and extends down through the switch terminating in a boss 83 at the bottom for actuation by the timer cam arm 76 when it moves angularly.

The timer motor, not shown, embodied in the timer, and the solenoid 72 are connected in parallel to the normally open terminal 84 of the switch 90. As shown in FIG. 8, the switch 80 is in the manually actuated closed position with the normally open terminal 84 in contact with the switch contact point 85. This is effected by manually pushing the stem 81 downwardly by depressing the knob 82, this moves the contact point 85 from the dotted line position indicated to the solid line position shown connecting power to the terminal 84. The boss 33 on the bottom of the stem 81 now lies in the downward position shown in solid lines. The switch is now "depressed" as indicated in solid lines in FIG. 8 and power is connected to the normally open terminal 84. This energizes the timer motor to rotate the arm 76 and energizes the solenoid 72 opening the valve 65 to permit water flow from supply to the tank 50 and from the tank 50 to the pot 29.

The timer 75 is shown in FIG. 8 in the start position to which it automatically resets with the tab 78 abutting the stop 77. This is the point from which the timer starts rotational movement of the arm 76 towards the boss 83. By adjusting the arm 76 angularly forwardly and rearwardly relative to the boss 83, the time interval may be reduced or lengthened respectively as desired.

This disconnects power to the solenoid 72 permitting the valve 65 to close terminating the introduction of water in the tank. This also terminates the emission of water from the tank to the pot 29. This also terminates power to the timer 75 which terminates clockwise rotation of the arm 76. It will be understood that the timer also winds a clock spring while moving the arm 76 angularly clockwise and that upon termination of electric power to the timer 75 that the timer clock spring moves the arm 76 counterclockwise to the position illustrated in FIG. 7 thereby effecting automatic reset.

Figure 11:
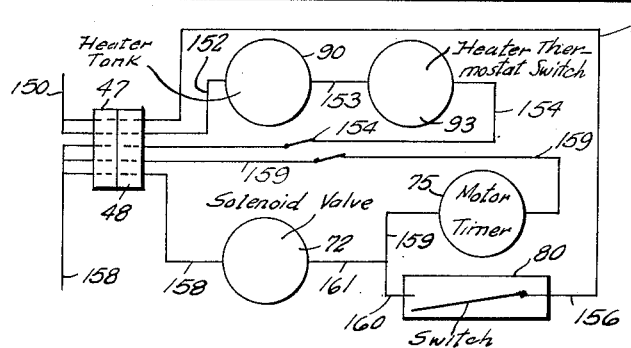
FIG. 11 is a wiring diagram showing the electrical components in a suitable circuit.

The wiring diagram, FIG. 11, shows electrical power leads 150 and 151 leading to the female block 47 on the cabinet box 20. The lead 150 is connected to two sockets in the block 47 and the lead 151 is connected to three sockets in the block 47. Leads 152, 153, and 154 connect the heating element 90 and thermostat switch 93 in series between the prongs in the male block 48 connecting with the sockets in the female block 47. The male block 48 is carried by the machine unit 23.

A lead 155 connects one side 156 of the switch 80 to the power lead 150 through the blocks 47 and 48. A lead 157 connects one side of the motor 75 to the power lead 151 and a lead 158 connects one side of the solenoid valve 72 to the power lead 150; both are connected through the blocks 47 and 48.

A lead 159 connects the other side of the motor 75 to the other side 160 of the switch 80 and a lead 161 connects the other side of the solenoid valve 72 to the other side 160 of the switch 80. Thus the timer motor 75 and the solenoid valve 72 are inparallel and are controlled by the switch 80.

The switch 80 shown in FIG. 9 has a rectangular hollow case. A side 156 on the switch case terminates inwardly in a downward off-set upwardly standing end 200 which has a slot 201. The contact 85 is a strip with one end in the slot 201 so as to have up and down movement and with the other end between the like sides 160 and 160A having inner ends 202 and 202A. A spring 203 is connected to the middle of the strip 85. The strip 85 pivots on the spring 203 at both ends so as to make and break electrical contact between the ends 202 and 202A.

The spring 203 lies in an opening in the stem 81. When the stem 81 is moved up the spring 203 moves up and the contact 85 engages the end 202 of the side 160. When the stem moves down, the spring 203 moves down and the contact 85 moves down. In this regard the opposite end of the contact 85 moves in the opposite direction and position in the slot 201 and the stem 81. The center point of the spring 203 and contact 85 pivot is midway between the positions shown so that in the positions shown the contact is past center and locked.

When the timer 75 starts to run, it slowly swings the cam arm 76 toward the depressed boss 83 on the depressed switch stem 81. While the timer 75 swings the cam arm 76, the solenoid 72 is also energized opening the valve 65 permitting water to flow in the system. When the cam arm 76 contacts the boss 83 it moves it upwardly forcing the stem upwardly which moves the contact point 85 away from the terminal 84 which disconnects power to the solenoid 72 which permits the valve 65 to close stopping water flow in the system. This also disconnects power to the timer 75 which resets automatically by returning the cam arm 76 to the position shown.

The period of time elapsing from the time the timer is started until power is disconnected is co-ordinated to the volume flow rate of the flow rate control valve 63. Both may be adjustable to obtain the desired water volume and the time period of the coffee making cycle.

An easy adjustment may be made by loosening the nut 79 on the timer 75 and adjusting the starting position of the cam arm 76 relative to the switch stem boss 83. This provides an easy adjustable control on water volume.

As hereinbefore indicated, the blocks 47 and 48 have suitable electrical connections for connecting power to the switch 80, solenoid 72, timer 75, heating unit 90 and the thermostat 93 in a usitable circuit to furnish electric power as desired.

To support the pot 29, paired slide tracks 100 and 101, FIG. 8, are provided on the bottom of the support plate 55 in the area of the dispersing nozzle 27. The pot 29 is provided with a suitable outwardly extending top flange 104 for engaging the slide tracks 100 and 101. Flat springs 102 and 103, FIG. 8, are located on the top of the slide tracks 100 and 101 respectively for spring pressing against the flange on the pot 39 to hold the pot firmly in position below the dispersing nozzle 27. The pot flange 104 is indicated in FIG. 5.

The removable front cover 105, FIG. 3, is detachable by removing the screws 106, FIGS. 5 and 7, from the top case 22 so as to expose the timer and thermostat as seen in FIG. 7. The stem 81 of the switch 80 extends through an aperture of the case 22 and the knob 82 is removable from the stem 81 by a screw connection 107, FIG. 9.

A lamp 108 may be connected in the electrical circuit to provide illumination through the removable front cover 105 which is translucent. The translucent cover 105 and the lamp 108 provide an advertising medium carrying desired information such as "hot coffee." The trademark of the machine may also be placed on the translucent cover such as "Lora-Matic."

A filter cup 109 is located in the pot 29 and rests on a perforated plate 110 which is spaced above a siphon outer tube 111 having apertures 112 at the bottom which surrounds a siphon inner tube 113 having apertures 114 at the top leading to a hollow interior chamber 115 venting to atmosphere above the container 30. The apertures 112 and/or the apertures 114 are sized so as to transfer fluid at a lesser rate than is emitted through the dispersing nozzle 27 as controlled by the flow rate control valve 63. This causes the water to back up and fill the pot with hot water to a point above the ground coffee 116 in the filter cup 109.

To install a device of the invention, the cabinet box is placed in the desired location and the water supply line 46 is brought through the back of the cabinet box and secured to the manual shut-off valve 26. The necessary electrical leads are brought in and connected to the terminal block 44 in the bottom of the cabinet box. This connects power to the various stove heating units 31. An individual switch 33A and 33B, on each stove 33 controls power to the heating units 31. The necessary electrical connections are also made to the female terminal block 47. The cabinet in now ready for the installation of the coffee machine unit 23.

The coffee machine 23 is then inserted in the cabinet box 20 through the open front 24. The back of the base support plate 52 is located below the flange 43 and the bolts 54 screwed through the plate 52 into the frame 45. This locks the unit 23 in the cabinet box 20. The coupling 60 is connected to the manual shut-off valve 26 and the valve turned on. The electrical terminal blocks 47 and 48 are connected and the device is operable.

To make ready for operation, the switch 80 is closed to actuate the solenoid 72 to open the valve 65 and water flows into the tank 50. The switch 80 may be closed until water emits from the dispersing nozzle 27. This insures that the tank 50 is full and the heating element 90 immersed in water. The thermostat 93 is set and the water allowed time to heat. Upon the thermostat shutting off, the water is heated. The water temperature may be checked and the thermostat reset as desired.

The front panel 21 is screwed in position and the top case 22 positioned. The top case is secured at the rear by slipping the tangs 120 on the case 22 into apertures 121 in the back panel 40, FIGS. 5 and 6. The tangs 20 may be ferrules fixed on the top case 22 as shown. This secures the rear of the top case 22 against up and down movement. The front cover 105 is set between flanges 122 on the case 22 and the flanges 123 on a frame 124 mounted on the top support plate 55. The thumb screws 106 are then screwed through the flanges 122 and cover 105 into the frame flange 123 locking and securing the parts together. The knob 82 is then screwed on the switch stem 81 and the device is ready for operation. The device is now ready to use.

In operation, the operator then depresses the switch knob 82' closing the switch 80 contact 85 to energize the solenoid 72 to open the valve 65 whereupon hot water emits from the tank through the high arched outlet line 71 and through the dispersing nozzle 27 falling on the coffee 116. The pot transfers the coffee made therein to the container 30.

As soon as the switch contacts are closed the timer is energized and starts slowly rotating the cam arm 76 toward the boss 83 on the switch actuator stem 81. After a desired time period, the arm 76 cams the boss 83 upwardly opening the switch contacts to the solenoid whereupon the valve 65 closes and water emission stops. This also de-energizes the timer 75 and the timer resets the arm 76 automatically. The device is now ready to be used again.

To make a batch of coffee the operator has only to put the filter cup 109 in the pot 29, place ground coffee in the filter cup 109, slide the pot 29 in position under the dispersing nozzle 27, place the container 30 on the heating unit 31, and depress the switch knob 82. The coffee is then made automatically.

The operator can stop the machine at any time simply by lifting the switch knob 82.

The original positioned setting of the cam arm 76 is made at the factory based on average use and/or coffee batch volume. This may differ from location to location. Also a spring washer, not shown, may be disposed between the nut 79 and the cam arm 76 on the timer 75. This allows the operation or the service man to change the position of the cam arm 76 without tools to suit the situation.

Some operators prefer to make large volume batches of coffee while others prefer to make small volume batches of coffee. Rush hour periods and lull periods may also determine the volume of the coffee batch. Thus the volume of the coffee batch may be easily changed by the operator by merely moving the cam arm 76.

Most operators prefer to fill the container 30 without overflowing it. This also is easily effected by adjusting the position of the cam arm 76 to suit the volume of the container 30. The taste, quality, strength, and flavor of the coffee may also be controlled to suit the operator in this manner either relative to a given quantity of ground coffee or to a variably selected quantity of ground coffee in the filter cup 109 of the pot 29.

Additional water may be added to a batch after it is finished by raising the switch knob 82 for a short period of time. Also the brewing of a batch may be depressing the switch knob 82. This is desirable at times such as when only the first brewing of the ground coffee is wanted. In other words, additional water may be added to a coffee batch by closing the switch 80 and less water may be used in a batch by closing the switch 80 prior to the end of the automatic time cycle.

Thus, the operator has complete control of the coffee machine operator through the single switch knob 82.

Thus, the operator has complete control of the coffee machine batch volume by adjusting the cam arm 76.

Should a coffee machine failure occur, a serviceman can remove an old unit 23 and replace it with a new unit in very few minutes. This facilitates factory repair, one trip service, and a minimum of machine downtime. The serviceman need only change the units as the factory or service plant repairs them.

The inventive coffee machine with the features described constitutes a compact, durable, and neat appearing mechanism which is easily operated and serviced.

Although but a single embodiment of the invention has been shown and described in detail, it is obvious that many changes may be made in size, shape, detail and arrangement of the various elements of the invention within the scope of the appended claims.

I claim:
1. A device for making coffee in restaurants and the like comprising a
cabinet box and a coffee making machine unit easily inserted and removed from said cabinet box;
said cabinet box having at least one removable portion providing an opening in said cabinet box through which said unit is insertable and removable;
a frame in said cabinet box for supporting said unit;
said unit comprising a water tank having a top and a bottom;
a bottom support plate on said tank bottom, securing means for quickly fastening and unfastening said tank bottom support plate relative to said cabinet box frame;
water connecting means on said tank;
electrical connecting means on said tank;
water supply connecting means in said cabinet box easily connectable and disconnectable with said water connecting means on said tank top plate;
electric power supply connecting means in said cabinet box easily connectable and disconnectable with said electrical connecting means on said tank;
said machine unit being easily and quickly insertable and removable as a whole relative to said cabinet by removing said cabinet box removable portion;
said machine unit also comprising a flow rate control valve on said tank leading from said water connecting means;
a solenoid operated normally closed shut-off valve leading from said flow rate control valve;
a water input line leading from said shut-off valve to said tank;
a water outlet line leading from said tank to convey hot water from said tank;
a dispersing nozzle on said tank leading from said water outlet pipe;
a solenoid for opening said normally closed shut-off valve;
a switch connected to said electric power connecting means leading to said solenoid for connecting electric power selectively to said solenoid to open said shut-off valve and for disconnecting electrical power to said solenoid to permit said shut-off valve to close;
said switch having a push-pull stem leading through said switch for opening and closing said switch;
said stem having a knob lying outside said cabinet,
said stem being manually by said knob movable in one direction closing said switch and movable in the opposite direction opening said switch;
said switch having a boss inside said cabinet box;
an automatic reset timer connected to said switch in circuit with said solenoid so as to be powered during same time as said solenoid by said switch;
said timer upon being powered moving an actuator arm;
said actuator arm upon moving for a predetermined time contacting said switch stem boss and moving said stem in the opposite direction to open said switch to disconnect power to said solenoid and said timer whereupon said shut-off valve closes and said timer resets said actuator arm to the starting position;

said timer actuator arm time of movement being coordinated with said flow control valve water flow rate to emit a determined volume of water while said shut-off valve is open;

a heating element in said tank, a thermocouple in said tank adjacent said cold water inlet feed line for measuring tank water temperature adjacent thereto;

a thermostat connected to said thermocouple so as to be actuated thereby, means connecting electric power to said heating element through said thermostat;

a switch in said thermostat controlling power to said heating element;

said thermostat being selectably settable to connect electric power to said heating element to heat water in said tank as controlled by said thermostat setting and said thermocouple measurement; and said thermocouple being adjacent said water inlet tube to be immediately reactive to water temperature change upon the introduction of cold water to said tank to effect heating same immediately upon introduction.

2. In a device as set forth in claim 1, a pot removably supported on said tank top plate below said dispersing nozzle;

a perforate plate in said pot spaced above said pot bottom;

a filter cup on said plate for holding ground coffee so that hot water emitting from said nozzle falls on said ground coffee;

said pot having an aperture in its bottom; and a siphon in said pot below said perforate plate over said aperture having a flow rate slower than the rate of flow of said flow rate control valve for backing up water in said pot to immerse ground coffee in said filter cup;

said siphon emitting liquid coffee through said pot aperture receivable in a container on said cabinet.

3. A device for making coffee in restaurants and the like comprising a cabinet box and a coffee making machine unit easily inserted in and removed from said cabinet box;

said cabinet box having at least one removable portion providing an opening in said cabinet box through which said unit is insertable and removable;

a frame in said cabinet box supporting said unit;

said unit comprising a water tank having a top and a bottom;

a bottom support plate on said tank bottom, securing means for quickly fastening and unfastening said tank bottom support plate relative to said cabinet box frame;

a top plate on said tank top;

water connecting means on said tank top plate;

electrical connecting means on said tank top plate;

water supply connecting means in said cabinet box including a manual shut-off valve easily connectable and disconnectable with said water connecting means on said tank top plate;

electrical power supply connecting means in said cabinet box easily connectable and disconnectable with said electrical connecting means on said tank top plate;

said machine unit being easily and quickly insertable as a whole relative to said cabinet box by the acts of removing said cabinet box removable portion, inserting said unit in said cabinet box opening, fastening said securing means, connecting said water supply connecting means, connecting said electric power supply connecting means, and replacing said cabinet box removable portion;

said machine unit being easily and quickly removable relative to said cabinet box by the acts of removing said cabinet box removable portion, unfastening said securing means, disconnecting said water supply connecting means, disconnecting said electric power connecting means, and removing said machine unit from said cabinet box opening;

said machine unit also comprising, a water filter on said tank top plate leading from said water connecting means;

a flow rate control valve leading from said water filter;

a normally closed shut-off valve leading from said flow rate control valve;

a water input line leading from said shut-off valve to said tank extending to a point adjacent said tank bottom to introduce cold water adjacent said tank bottom;

a water outlet line leading from said tank top to convey hot water from said tank;

a dispersing nozzle on said tank top plate leading from said water outlet pipe;

a solenoid for opening said normally closed shut-off valve;

a switch connected on said electric power connecting means leading to said solenoid for connecting electric power selectively to said solenoid to open said shut-off valve and for disconnecting electrical power to said solenoid to permit said shut-off valve to close;

said switch having a push-pull stem leading through said switch for opening and closing said switch;

said stem being manually movable in one direction closing said switch and movable in the opposite direction opening said switch;

an automatic reset timer connected to said switch in circuit with said solenoid so as to be powered during the same time period as said solenoid by said switch;

said timer upon being powered moving an actuator arm;

said actuator arm upon moving for a pre-determined time contacting said switch stem and moving said stem in the opposite direction to open said switch to disconnect power to said solenoid and said timer whereupon said shut-off valve closes and said timer resets said actuator arm to the starting position;

said timer actuator arm time of movement being coordinated with said flow control valve water flow rate to emit a determined volume of water while said shut-off valve is open.

4. In a device as set forth in claim 3, a pot movably supported on said tank top plate below said dispersing nozzle, a perforate plate in said pot spaced above said pot bottom;

a filter cup on said plate for holding ground coffee so that hot water emitting from said nozzle falls on said ground coffee;

said pot having an aperture in its bottom; and a siphon in said pot below said perforate plate over said aperture having a flow rate slower than the rate of said flow of said flow rate control valve for backing up water in said pot to immerse ground coffee in said filter cup;

said siphon emitting liquid coffee through said pot aperture receivable in a container on said cabinet box.

5. In a device as set forth in claim 3, a heating element in said tank;

a thermocouple in said tank adjacent said cold water inlet feed line for measuring tank water temperature adjacent thereto;

a thermostat connected to said thermocouple so as to be actuated thereby, means connecting electric power to said heating element through said thermostat;

and a switch in said thermostat controlling power to said heating element;

said thermostat being selectably settable to connect electric power to said heating element to heat water in said tank as controlled by said thermostat setting and said thermocouple measurement;

said thermocouple being adjacent said water inlet tube to be immediately reactive to water temperature change upon the introduction of cold water to said tank to effect heating same immediately upon introduction.

References Cited by the Examiner
UNITED STATES PATENTS

| | | | |
|---|---|---|---|
| 1,663,081 | 3/1928 | Hertzberg. | |
| 1,737,834 | 12/1929 | Eaton. | |
| 2,609,268 | 9/1952 | Nye | 312—320 |
| 2,641,992 | 6/1953 | Clemens | 88—282 |
| 2,946,902 | 7/1960 | Hagen | 200—38 X |
| 3,011,426 | 12/1961 | Mueller | 99—282 |
| 3,016,930 | 1/1962 | Dziedziula | 99—282 |
| 3,034,417 | 5/1962 | Bunn | 99—238 |
| 3,074,340 | 1/1963 | Walton | 99—283 |
| 3,074,341 | 1/1963 | Tarrant | 99—305 |

WALTER A. SCHEEL, *Primary Examiner.*

JOSEPH D. BEIN, ROBERT E. PULFREY, *Examiners.*